(12) United States Patent
Aihara et al.

(10) Patent No.: US 8,740,060 B2
(45) Date of Patent: Jun. 3, 2014

(54) MOBILE PRODUCT ADVISOR

(75) Inventors: Toru Aihara, Yokohama (JP); Noboru Kamijo, Fujisawa (JP); Robyn R. Schwartz, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 257 days.

(21) Appl. No.: 13/222,422

(22) Filed: Aug. 31, 2011

(65) Prior Publication Data

US 2013/0048708 A1    Feb. 28, 2013

(51) Int. Cl.
*G06F 17/00*    (2006.01)
(52) U.S. Cl.
USPC .......................................... 235/375; 235/385
(58) Field of Classification Search
USPC ........... 248/688, 442.2, 447, 447.1, 917, 918; 361/724–727, 679.01–679.61; 235/375, 383, 385, 462.09
See application file for complete search history.

(56) References Cited

U.S. PATENT DOCUMENTS

| | | | | |
|---|---|---|---|---|
| 5,548,478 A * | 8/1996 | Kumar et al. | ............ | 361/679.27 |
| 6,515,852 B2 * | 2/2003 | Huang et al. | ............ | 361/679.08 |
| 6,915,954 B2 * | 7/2005 | Knowles et al. | ......... | 235/462.01 |
| 7,206,198 B2 * | 4/2007 | Wang | ...................... | 361/679.55 |
| 8,126,147 B2 * | 2/2012 | Farley et al. | .................. | 380/270 |
| 2003/0149526 A1* | 8/2003 | Zhou et al. | .................... | 701/213 |
| 2008/0186166 A1* | 8/2008 | Zhou et al. | ............... | 340/539.13 |

* cited by examiner

*Primary Examiner* — Daniel St Cyr
(74) *Attorney, Agent, or Firm* — Cantor Colburn LLP; Vazken Alexanian (57) ABSTRACT

Mobile product advising includes creating, via a computer processor, vectors for each of a number of subjects corresponding to a product and assigning attributes of the subjects to corresponding fields of the vector. The mobile product advising also includes assigning values in the fields of the vectors reflecting a status of the attributes relative to the subjects. The mobile product advising further includes creating a product label for the product and encoding the vector including the attributes and values on the product label.

17 Claims, 5 Drawing Sheets

| VECTOR | ATTRIBUTE | OMELETS | CHICKEN | BEEF | CAKE |
|---|---|---|---|---|---|
| 0 | OVO | 1 | 0 | 0 | 0 |
| 1 | LACTO | 0 | 0 | NULL | 0 |
| 2 | OVO-LACTO | 1 | 0 | 0 | 1 |
| 3 | VEGANISM | 0 | 0 | 0 | 0 |
| 4 | RAW VEGANISM | 0 | NULL | 0 | 0 |
| 5 | FRUITARIANISM | NULL | 0 | 0 | 0 |
| 6 | BUDDHIST VEG. | 1 | 0 | 0 | NULL |
| ... | ... | ... | ... | ... | ... |

| VECTOR | ATTRIBUTE | OMELETS | CHICKEN | BEEF | CAKE |
|---|---|---|---|---|---|
| 0 | DAIRY ALLERGY | 1 | 1 | 0 | 0 |
| 1 | WHEAT ALLERGY | 1 | 0 | 0 | 0 |
| 2 | EGG ALLERGY | 0 | 1 | NULL | 0 |
| 3 | SOY ALLERGY | NULL | 1 | 1 | 1 |
| 4 | YEAST ALLERGY | 1 | 1 | 0 | NULL |
| 5 | | | | | |
| 6 | | | | | |
| ... | ... | ... | ... | ... | ... |

| VECTOR | ATTRIBUTE | OVO-LACTO | OVO | EGG ALLERGY | SOY ALLERGY |
|---|---|---|---|---|---|
| 0 | OVO | 0 | 1 | 0 | 0 |
| 1 | LACTO | 0 | 0 | 0 | 0 |
| 2 | OVO-LACTO | 1 | 0 | 0 | 0 |
| 3 | VEGANISM | 0 | 0 | 0 | 0 |
| 4 | RAW VEGANISM | 0 | 0 | 0 | 0 |
| 5 | FRUITARIANISM | 0 | 0 | 0 | 0 |
| 6 | BUDDHIST VEG. | 0 | 0 | 0 | 0 |
| ... | ... | ... | ... | ... | ... |

FIG. 6

| VECTOR | ATTRIBUTE | OVO-LACTO | OVO | EGG ALLERGY | SOY ALLERGY |
|---|---|---|---|---|---|
| 0 | DAIRY | 0 | NULL | 0 | 0 |
| 1 | WHEAT | 0 | NULL | 0 | 0 |
| 2 | EGG | 0 | NULL | 1 | 0 |
| 3 | SOY | 0 | NULL | 0 | 1 |
| 4 | YEAST | 0 | NULL | 0 | 0 |
| ... | ... | ... | ... | ... | ... |

FIG. 7

MOBILE PRODUCT ADVISOR

BACKGROUND

The present invention relates to computer processing in a commerce environment, and more specifically, to a mobile product advisor.

Consumers often have diverse requirements and preferences for products based on their lifestyles, culture, and economic status. With the proliferation of information on the Internet, consumers are becoming inundated with so much information about products, it is difficult to sift through it all in an efficient way. In addition, by the time the consumer is prepared to purchase a product, much of the information is outdated or the consumer may have forgotten it. Likewise, it is in the best interests of enterprises selling products to be able to convey particularized product information to consumers so that the consumers receive the right amount of information sufficient to make an informed purchase.

SUMMARY

According to one embodiment of the present invention, a method for mobile product advising is provided. The method includes creating, via a computer processor, vectors for each of a number of subjects corresponding to a product and assigning attributes of the subjects to corresponding fields of the vectors. The method also includes assigning values in the fields of the vectors reflecting a status of the attributes relative to the subjects. The method further includes creating a product label for the product and encoding the vectors including the attributes and values on the product label.

According to another embodiment of the present invention, a system for mobile product advising is provided. The system includes a host system computer and logic executable by the host system computer. The logic is configured to implement a method. The method includes creating vectors for each of a number of subjects corresponding to a product and assigning attributes of the subjects to corresponding fields of the vector. The method also includes assigning values in the fields of the vectors reflecting a status of the attributes relative to the subjects. The method further includes creating a product label for the product and encoding the vectors including the attributes and values on the product label.

According to a further embodiment of the present invention, a computer program product for mobile product advising is provided. The computer program product includes a computer-readable storage medium having instructions embodied thereon, which when executed by a computer, cause the computer to implement a method. The method includes creating vectors for each of a number of subjects corresponding to a product and assigning attributes of the subjects to corresponding fields of the vectors. The method also includes assigning values in the fields of the vectors reflecting a status of the attributes relative to the subjects. The method further includes creating a product label for the product and encoding the vectors including the attributes and values on the product label.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In an exemplary embodiment, mobile product advising services are provided. The mobile product advising services enable enterprises to define product-related vectors for different subjects associated with products sold by the enterprises. The product-related vectors include attributes identifying characteristics of the subjects. Product labels are then created with this information encoded thereon. Consumers are able to identify and receive particularized information about products or services at a point of purchase through a mobile device or kiosk. The mobile product advising incorporates the use of the product labels with encoded product information and a mobile application for configuring user preferences. The user preferences are defined using personalized subject vectors. When an end user device, such as a mobile phone scans a product label for its product information, the mobile application identifies matching attributes in terms of the end user's preferences from the user's personalized subject vectors with the product-related vectors, and provides this information to the end user device. These and other features of the mobile product advising will now be described.

Figure 1:
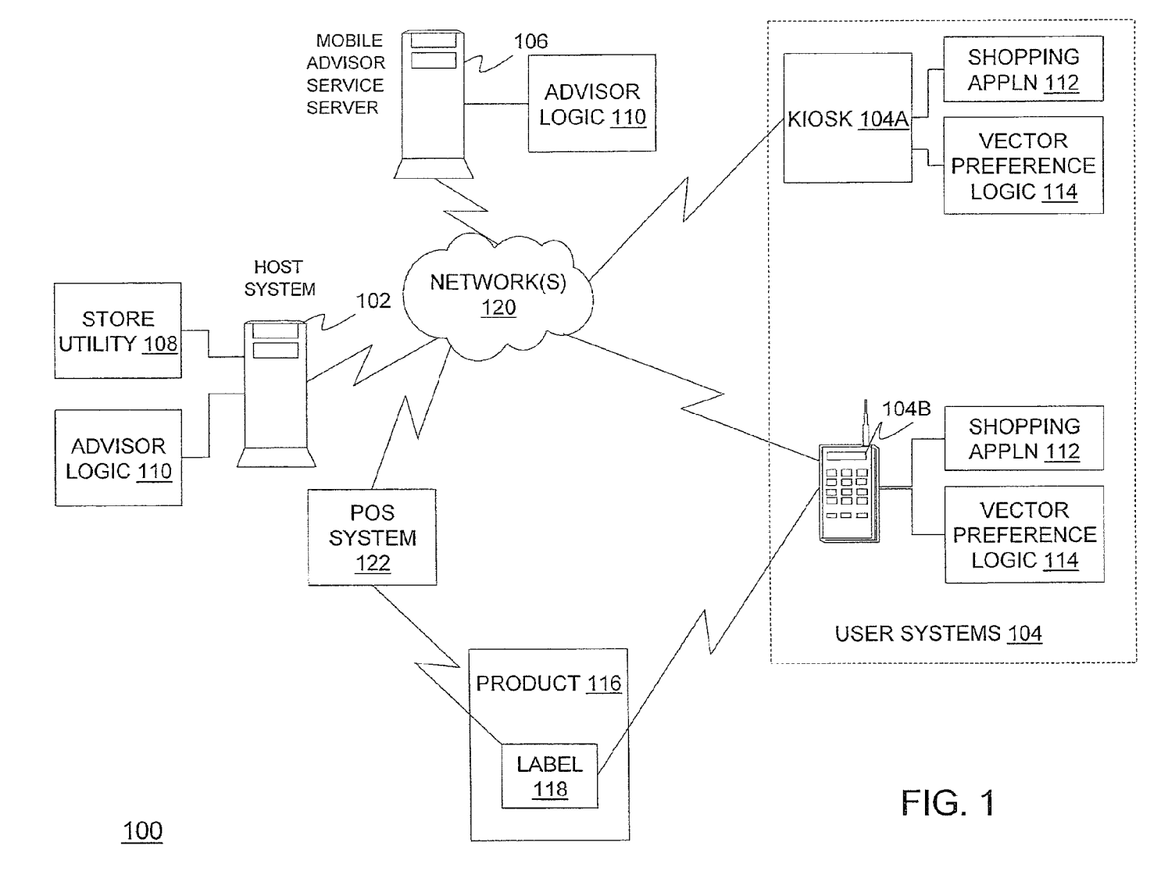
FIG. 1 depicts a block diagram of a system upon which mobile product advising may be implemented in an exemplary embodiment.

Turning now to FIG. 1, a system 100 upon which the mobile product advising may be implemented will now be described in an exemplary embodiment. The system 100 of FIG. 1 includes a host system 102 and user systems 104 in communication with one or more networks 120.

The host system 102 may be any type of computer processing device (e.g., a general-purpose computer or a high-speed computer, such as a mainframe). The host system 102 may be a provider of the exemplary mobile product advising services described herein. In one embodiment, the host system 102 is operated by a business enterprise that sells products or services to consumers (e.g., user systems 104). The host system 102 may be a centralized server system that manages the business operations of one or more retail stores or establishments, e.g., in a client-server environment over the networks 120, and the retail stores or establishments operate computers (not shown) used in implementing the mobile product advising services. In another embodiment, the host system 102 may be operated by a service provider (e.g., application service provider) that facilitates the mobile product advising services to its customers (e.g., the establishment implemented via the host system 102) over the networks 120. In this embodiment, a mobile advisor service server 106 is included in the system 100 for providing the mobile product advising services, and the mobile product advising services may be standardized across a plurality of different businesses or enterprises for a wide range of products and services. For purposes of illustration, the mobile product advising services are described herein with respect to the food industry.

The host system 102 is communicatively coupled to one or more point-of-sale (POS) systems (e.g., POS system 122). A POS refers to a device and location through which transactions, such as purchases occur and includes hardware and software elements for performing these, and related, transactions. The POS 122 may include an electronic cash register. The host system 102 may communicate with the POS system 122 over one or more networks 120 (e.g., a local area network of the establishment implementing the host system 102) or may be directly connected to the POS system 122, e.g., via wireline means (not shown). The POS system 122 is communicatively coupled with products 116 via labels 118 as will be described further herein.

The user systems 104 are operated by consumers of products or services provided by the host system 102 (or establishment serviced by the host system 102). By way of non-limiting examples, the user systems 104 include a kiosk 104A and a mobile device 104B. The kiosk 104A may be installed in the establishment of the system 100 and provides product information to customers via a computer processor provided therein. The mobile device 104B may be a cellular telephone or smart phone owned by a customer of the establishment. The kiosk 104A and the mobile device 104B may each include scanning components that enable customers to scan product labels for product information. In one embodiment, the scanning components include an electronic reader, such as a two-dimensional data matrix code reader or a radio frequency identifier (RFID) reader. In an embodiment, the kiosk 104A and the mobile device 104B each include a shopping application 112 and vector preference logic 114. The shopping application 112 enables customers to search, price, and purchase products. In an exemplary embodiment, the vector preference logic 114 is configured to allow end users or customers to establish certain preferences with respect to the mobile product advising services, as will be described further herein.

In an embodiment, the host system 102 executes a store utility 108 and advisor logic 110. The store utility 108 may include one or more applications that enable the enterprise or establishment of system 100 to identify, track, and otherwise manage products sold by the enterprise. For example, the store utility 108 may include a database management application for classifying, storing, and tracking products procured and sold by the enterprise. In one embodiment, the store utility 108 includes an electronic label application, such as an electronic shop label (ESL) application or bar code label application for encoding product data on labels that are affixed to products or otherwise associated with the products provided by the enterprise. In an exemplary embodiment, the advisor logic 110 is configured to enable enterprise representatives to set up, maintain, and update product databases that include subject vectors defined and managed by the enterprise representatives.

As indicated above, the mobile product advisor services may be implemented by a service provider for enterprises offering a variety of different products and services. As shown in FIG. 1, a mobile advisor service server 106 includes advisor logic 110 for providing these services. The mobile advisor service server 106 may be implemented as a high-speed computer processing device, such as a mainframe computer. The mobile product advisor services may be implemented as a standardized service that maintain versions of vectors and distributes vector templates (e.g., templates for product related vectors) to retailers, such as the host system 102. Retailers may then select some of all of the product related vectors and set attributes appropriate for each product. The mobile advisor service server 106 may provide a database of such product related vectors to retailers.

The consumers may set their preferences via their mobile devices (e.g., mobile device 104B) by accessing the shopping application 112, which interfaces with the vector preference logic 114. The mobile product advisor services, provided by the mobile advisor service server 106 or the host system 102, may send templates for personalized subject vectors to the shopping application 112, and the consumers may select some of all of the personalized subject vectors and set attributes according to their preferences. The consumers may also upload their preferences to the host system 102 or the mobile advisor service server 106 so that the mobile product advisor services may serve them better. Alternatively, the consumers may access the mobile product advisor services from their home personal computers or their mobile devices, set and save their preferences at the mobile adviser service server 106 or retailer (e.g., host system 102), and then download the completed vectors to their mobile devices (e.g., user system 104B). Preferences may be stored in the consumer's mobile devices to ensure privacy, except when the consumers permit the mobile product advisor services to use their preference information to serve them better or in exchange for some benefit.

Also shown in the system 100 of FIG. 1 is a product 116 with a product label 118 affixed thereto. The label 118 includes an encoded portion created via the host system 102. The label 118 may include a name or description of the product, as well price information. In order to ensure that labels are easy for consumers to read, they are typically generated using text or images having a typeset or font that is large enough for the average consumer to read without undue strain, and so they typically contain minimal information regarding the specifics of the product. In the food industry, e.g., pricing is typically only one consideration in purchasing a product. Many of today's consumers desire more information, such as product ingredients, allergy information, nutritional value, known health benefits, whether additives are included, whether the product is organically grown, and whether the product is native grown or imported from another location, to name a few. However, due to size and space limitations for labels, providing the breadth of this type of information on a product label may have the opposite effect of conveying valuable information, but rather may serve to detract or confuse the consumer (i.e., information overload). In an embodiment, the mobile product advising services provide the ability for an enterprise to encode more specific and detailed information about the product on the label 118 using product related subject vectors created via the mobile advisor service server 106 and/or the retailer (e.g., host system 102), and the encoded information contains detailed product information so that the consumer is able to make more informed purchasing decisions at the point of sale. Additionally, since consumers typically have different needs or requirements (e.g., one customer may be more interested in organically grown products, while another may only be concerned with food allergies), providing too much information makes it difficult for the consumer to find the particular information they desire. Thus, in an exemplary embodiment, the mobile product advising services enable consumers to customize or personalize their product information preferences via personalized subject vectors provided b the vector preference logic 114 so they receive from these labels only the particular information that is pertinent to them. When the consumer scans a product label's 118 code, the mobile product advising services retrieve and display on the consumer's device only the information relevant to the consumer.

In an exemplary embodiment, the product label 118 is an electronic label that is capable of communicating with the host system 102 and provides dynamic information in response to requests from the host system 102. In an exemplary embodiment, the advisor logic 110 executing on the host system 102 is configured to control which of the subject product related vectors encoded on the product label 118 may actively provide information to consumer based on specified conditions. Conditions may include time of day, day of week, seasons of the year, and weather conditions, to name a few. For example, different shoppers may be expected in a retail establishment based on the time of day (e.g., stay-at-home mothers and the elderly during the day and career-oriented consumers in the evening). As different segments of a population typically have different needs or interests, the advisor logic 110 may be configured to convey targeted information to these consumers based on the conditions specified. The advisor logic 110 may be configured with the conditions such that selected product related vectors are activated and de-activated subject to the changing conditions. For example, suppose that a product label 118 is encoded with subject vectors A, B, C, D, and E. The advisor logic 110 may be configured to activate product related subject vectors A, B, and C during the day and activate product related subject vectors A, B, and D at night (thereby de-activating vector C). The activation/de-activation of the product vectors may be implemented, e.g., via the POS system 122 of the enterprise over a wireless communication network, such as a WiFi and/or infrared (IR). The POS 122 may automatically activate or de-activate select product vectors on the product label based on defined conditions configured through the advisor logic 110 that is communicated to the POS system 122 via the host system 102. Alternatively, the activation or de-activation may be manually implemented, e.g., by a store manager.

The product label 118 may be an electronic shopping label (ESL) or an electronic tag, such as a near field communications (NFC) code or a radio frequency identification (RFID) code. The label 118 may be a paper label attached to a product or may be attached to a shelf or display at or near the product. While the label 118 is illustrated in FIG. 1 as being disposed on a product 116, it will be understood that other items may be used in conveying information to consumers. For example, a restaurant enterprise may generate an encoded label 118 for its menu, whereby similar product information as described above may be provided (e.g., ingredients, allergy information, etc., with respect to menu items offered on the menu).

The networks 120 may be any type of networks known in the art (e.g., Internet, local area network, wide area network) and may include wireline and wireless technologies.

As indicated above, the mobile product advising services enable enterprises to define product-related vectors for different subjects associated with products sold by the enterprises. The product-related vectors include attributes identifying characteristics of the subjects.

Figure 2:
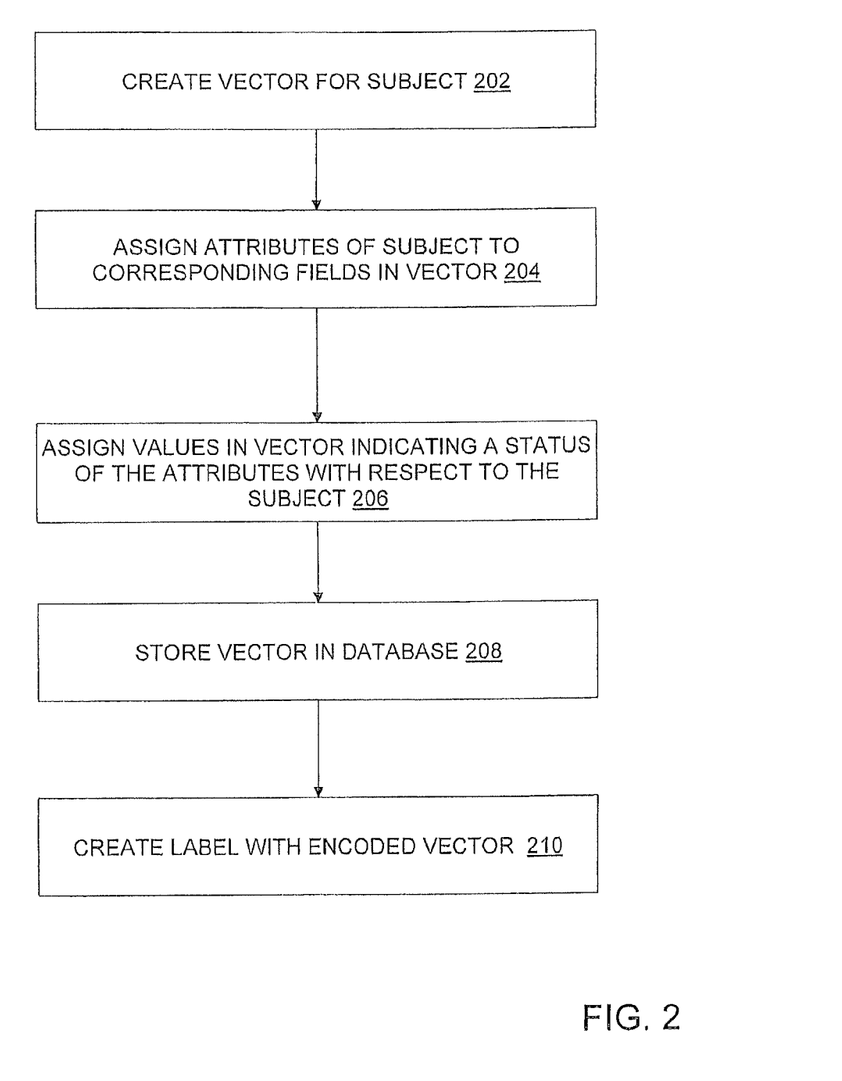
FIG. 2 is a flow diagram describing a process for implementing mobile product advising in an exemplary embodiment.

Turning now to FIG. 2, an exemplary process for implementing the mobile product advising will now be described. At step 202, the advisor logic 110 creates a vector for a subject with regard to one or more products. The subject may be pre-configured via the advisor logic 110 or may be customized by the enterprise executing the logic 110. Using the food industry as an example, subjects may include food allergies, diet plans, nutrition plans, and other food-related topics, such as organic foods and region grown.

Figure 3:
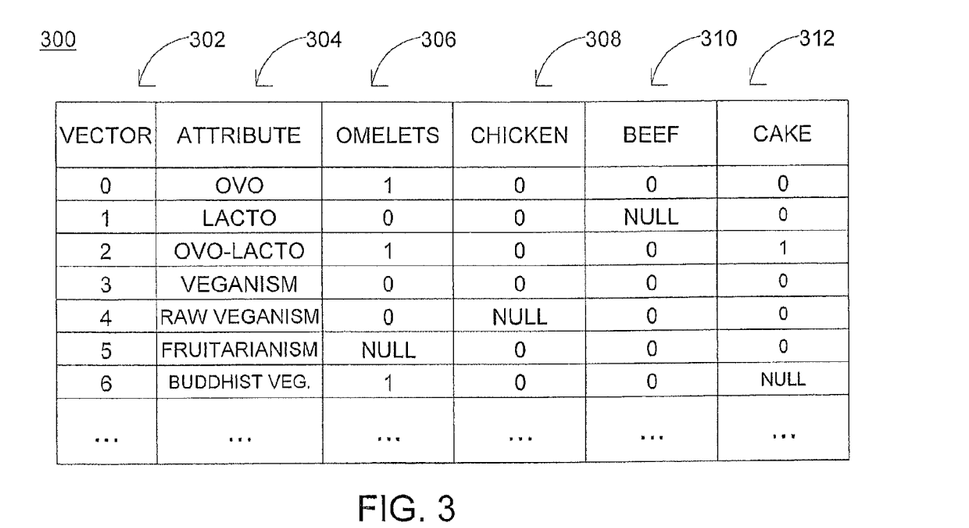
FIG. 3 is a vector for a subject with sample data created via the mobile product advising in an exemplary embodiment.

At step 204, attributes of the subject are assigned via the advisor logic 110 to corresponding values in the vector to reflect a status of the attributes with respect to the product, and the values are set accordingly at step 206. In one embodiment, the status reflects whether the product is acceptable or not to a consumer based on the consumer's preferences. In another embodiment, the status reflects the presence of the attribute with respect to a product, as will be described further herein. The attributes may be pre-configured for the subject, or they may be customized by the enterprise. Each vector includes a number of values, and each of the values represents an attribute of the subject. For example, suppose 'food allergies' is the subject. Attributes may be assigned to corresponding values of the vector as known food allergies, e.g., egg, dairy, wheat, soy, nuts, yeast, etc. In another example, suppose a vegetarian diet plan is the subject. Attributes may be assigned to corresponding values of the vector as variations associated with the diet (e.g., ovo, lacto, ovo-lacto, vegan, fruitarianism, etc.). A sample vector 300 for a vegetarian diet (i.e., the subject) with respect to certain products is shown in FIG. 3. As shown in FIG. 3, a vector column 302 lists the vector values for each attribute. An attribute column 304 lists the attributes for the subject (e.g., ovo, lacto, ovo-lacto, veganism, raw veganism, fruitarianism, and Buddhist vegetarianism. The product columns 306-312 list products (e.g., omelets, chicken, beef, and cake). For each product (i.e., product column), a value '0' or '1' is populated in the respective field. If '1' is populated in the field for a product, it means the product is acceptable and conforms with the corresponding attribute, or variation of the vegetarian diet. For example, as shown in FIG. 3, the product "omelets" in column 306 contains eggs. For a consumer following the ovo vegetarian diet, this product is considered acceptable and is permitted by the diet, as indicated by the value set to '1'. By contrast, since vegetarian diets do not include meat, the fields in the product columns 308 and 310 (chicken and beef, respectively) are set to '0' indicating that the product is not good for the diet, or are set to 'null' indicating that the product status is unknown or has not been defined for the product.

Figure 4:
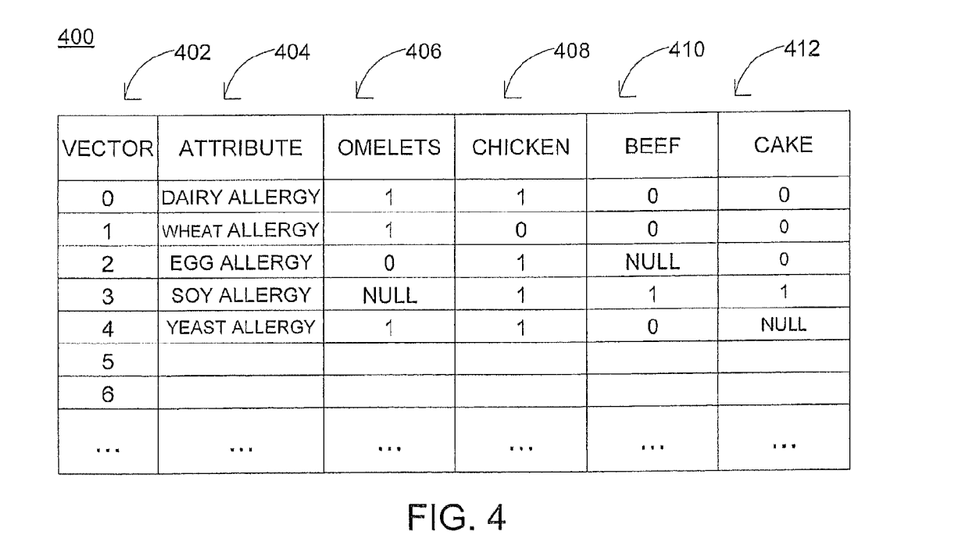
FIG. 4 is a vector for another subject with sample data created via the mobile product advising in an exemplary embodiment.

Turning now to FIG. 4, a sample vector 400 for food allergies with respect to certain products (i.e., the subject) is shown. As shown in FIG. 4, a vector column 402 lists the vector values for each attribute. An attribute column 404 lists the attributes for the subject (e.g., dairy, wheat, egg, soy and yeast). The product columns 406-412 list products (e.g., omelets, chicken, beef, and cake). For each product (i.e., product column), a value '0' or '1' is populated in the respective field. If '1' is populated in the field for a product, it means the product is good for the consumer with regard to the associated attribute. For example, a '1' in vector 2 "eggs" for product 408 "chicken" reflects that the product is good for individuals who are allergic to eggs. By contrast, the product "omelets" in column 406 contains eggs. For a consumer identified as having an allergy to eggs, this product is considered unacceptable, as indicated by the value set to '0'. Thus, products that indicate an allergen identified by the attribute column 404 are set to '0' indicating that the product is unacceptable for the consumer, or are set to 'null' indicating that the product status is unknown or has not been defined for the product.

At step 208, the advisor logic 110 stores the vectors and related information in the host system 102 storage.

At step 210, the shopping utility 108 (or advisor logic 110, if so configured) creates a product label encoded with the vector information. The product label may be encoded as a two-dimensional bar code, such as a data matrix code, QR code, or color code, or may be a universal product code (UPC) or radio frequency identification (RFID) code.

Figure 5:
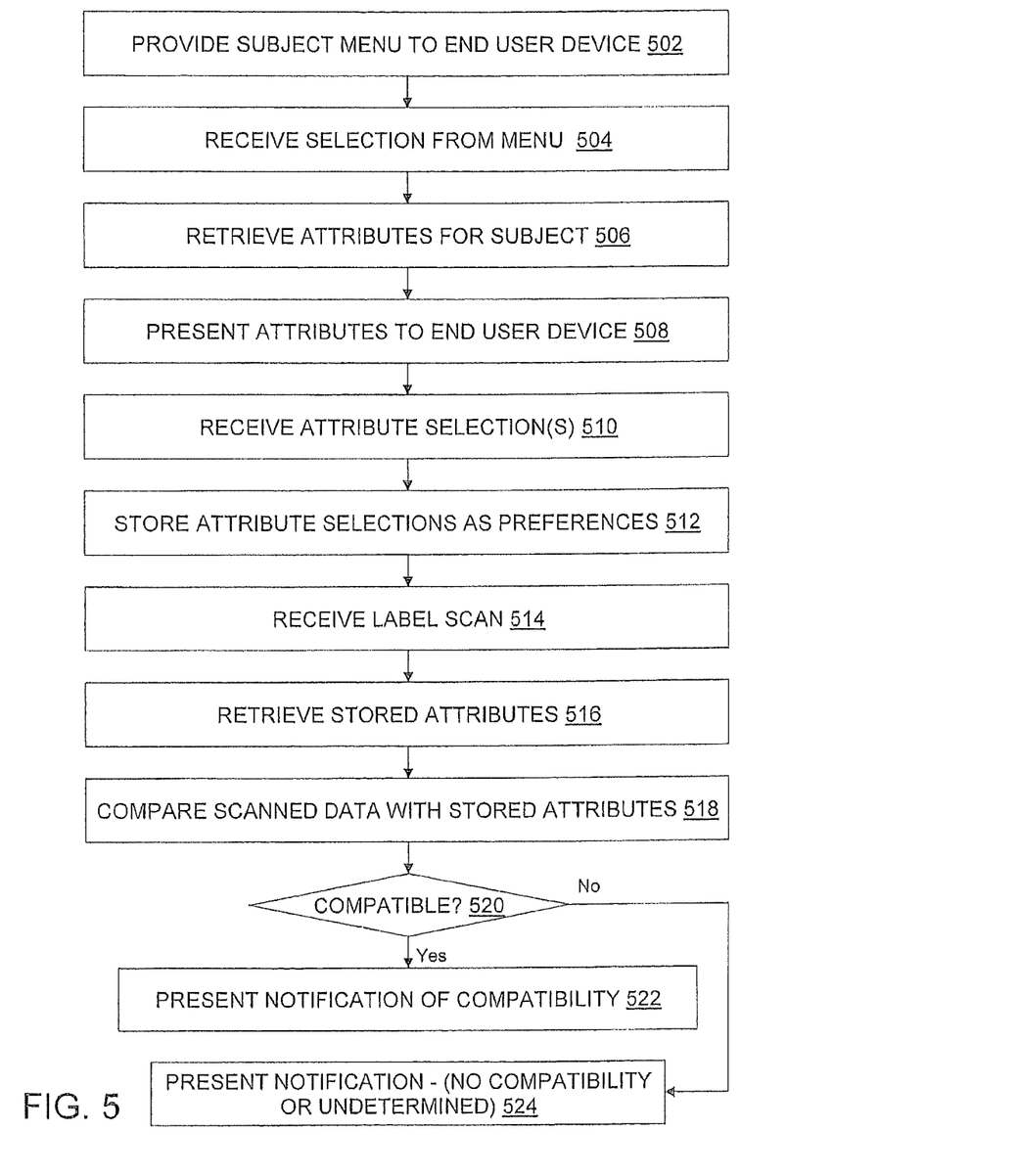
FIG. 5 is a flow diagram describing a process for implementing mobile product advising via an end user device in an exemplary embodiment.

The exemplary mobile product advising services may also include features for enabling customers or end users to establish preferences for use in identifying desired product information encoded on product labels (e.g., ESLs). These features are implemented via the vector preference logic 114. The vector preference logic 114 may be integrated with a shopping application (e.g., shopping application 112) or may be a standalone software application. In an exemplary embodiment, the vector preference logic 114 utilizes vectors for subjects similar to those identified above (e.g., vegetarian, allergy, etc.). Turning now to FIG. 5, a process for implementing the mobile product advising services by an end user or consumer will now be described in an exemplary embodiment. The vector preference logic 114 stores subject vectors including associated attributes as user preferences on the user system 104. In an alternative embodiment, at least a portion of the vector preference logic 114 may be implemented by the user systems 104 via the host system 102 (e.g., the host system 102 provides a user interface to the user systems 104), and the host system 102 stores the user preferences established by the user systems 104. The processes are described in FIG. 5 with regard to the food industry by way of example.

The end user may download or install the vector preference logic 114 to the mobile device 104B and/or the enterprise of the system 100 of FIG. 1 may install the vector preference logic 114 on the kiosk 104B. The vector preference logic 114 includes a user interface for prompting an end user through the features provided by the logic 114. The end user opens the vector preference logic 114 on the user system 104 and the vector preference logic 114 provides a subject menu to the user system 104 via, e.g., a display screen on the user system 104 at step 502. As indicated above, the subjects may include food allergies, diet plans, nutrition, etc.

Figure 6:
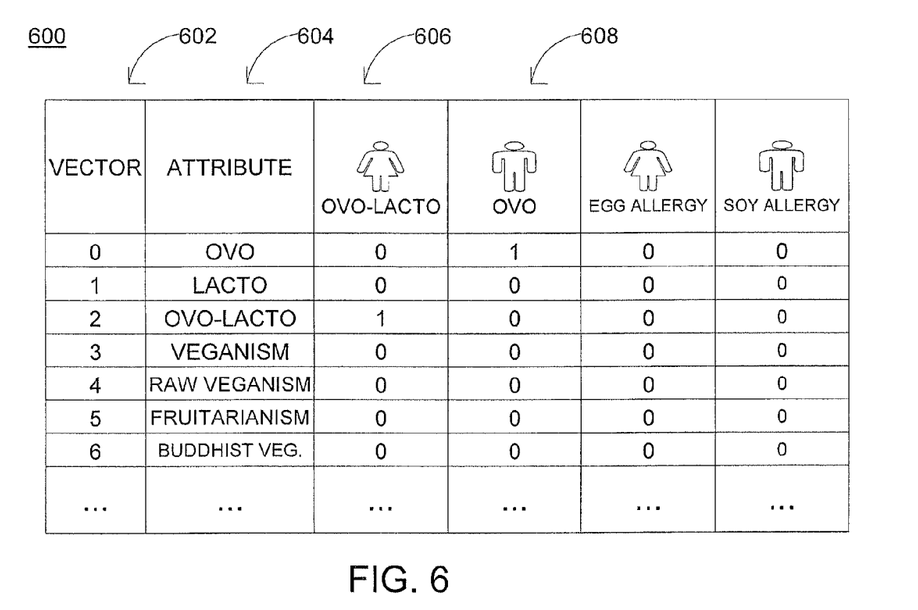
FIG. 6 is a vector for a subject with sample data created for an end user via the mobile product advising in an exemplary embodiment.
Figure 7:
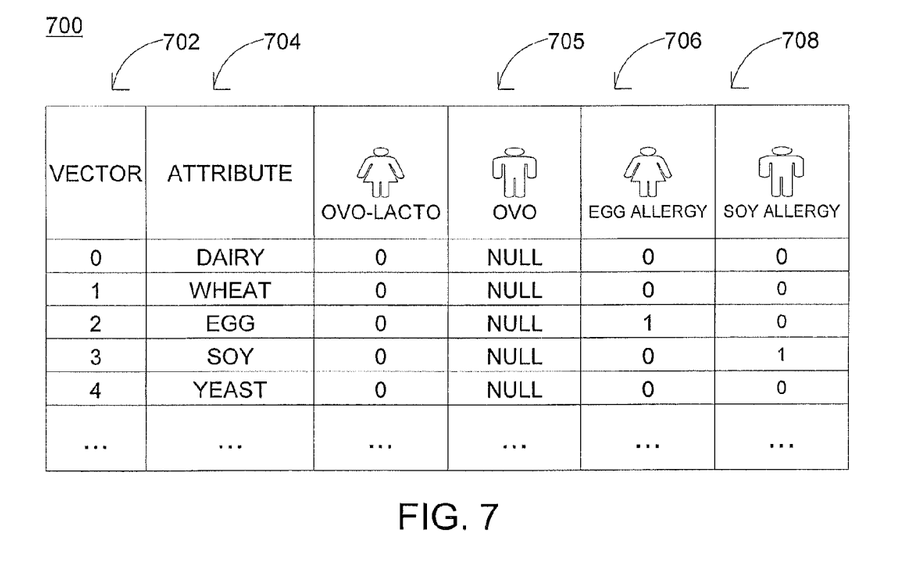
FIG. 7 is a vector for another subject with sample data created for an end user via the mobile product advising in an exemplary embodiment.

At step 504, the vector preference logic 114 receives a selection for one or more subjects (e.g., vegetarian diet and allergy) from the end user via the user system 104. At step 506, the vector preference logic 114 retrieves attributes for the selected subject and presents the attributes to the user system 104 at step 508. For example, if the user selects vegetarian diet, the vector preference logic 114 retrieves attributes, such as ovo, lacto, ovo-lacto, veganism, etc. At step 510, the vector preference logic 114 receives a selected attribute for the subject and stores the attribute selection as preferences in the user system 104 at step 512. As shown in FIG. 6, e.g., a vegetarian diet vector set 600 for end users includes a vector column 602 and attribute (variations of vegetarian diets) column 604. In addition, the vegetarian diet vector set 600 includes a vegetarian diet preference column 606 for a first end user. The processes described in steps 502-512 may be repeated for multiple subjects and end users of a mobile device as desired. For example, as shown in FIG. 6, a vegetarian diet preference column 608 for a second end user is provided. If a value '1' or '0' is present, the person is following the respective vegetarian lifestyle or not, indicated by the attribute. If a null value is present, the person's lifestyle is not yet defined. Further, as shown in FIG. 7, an allergy vector set 700 for end users includes a vector column 702 and an attribute (food allergies) column 704. In addition, the allergy vector set 700 includes an allergy selection column 706 for a first end user and an allergy selection column 708 for a second end user. If a value '1' or '0' is present, the person is indicated to have an allergy to the corresponding food corresponding to the attribute. If a null value is present, the person's allergy information has not been defined. For example, as shown in FIG. 6, a male user (column 608) is following an "ovo lifeystyle," and in FIG. 7, the same user (column 705) does not set his personalized subject vector for allergies as indicated by the 'null' values. The 'null' values reflect that the user is not interested in the allergy information associated with the allergy vector set 700.

Once these preferences are determined and set by the end users, the vector preference logic 114 is ready to be implemented by the end users.

At step 514, the vector preference logic 114 receives scanned data via a scanner component on the user system 104 and decodes the data. The scanned data is received from the label 118 (e.g., two-dimensional data matrix code). For two-dimensional or one-dimension bar codes, the user systems 104 may optically capture the bar code image with a built-in camera and decode the captured image. For NFC or RF tags, the user systems 104 trigger the tag with wireless communication and receive the information with wireless communication as a response. The vector preference logic 114 retrieves the end user's stored, personalized vectors and attributes (i.e., preferences) from the user system 104 at step 516 and compares the scanned data with the stored attributes at step 518.

At step 520, the vector preference logic 114 determines a compatibility indicator in response to the comparing performed at step 518. The compatibility indicator may reflect that the product scanned is compatible with the consumer's preferences, is not compatible with the consumer's preferences, or is undetermined with respect to the consumer's preferences. The vector preference logic 114 determines the compatibility by assessing whether a product presents all the corresponding product related vectors (from the scanned product 116) to all the personalized subject vectors in the user system 104, and all the preferences (e.g., attributes with '1' values) set in the personalized subject vectors have corresponding positive attribute values set for the product related vectors, then the product is determined to be compatible for the consumer. However, if a product presents all the corresponding product related vectors to all the personalized subject vectors in the user system 104, and any of the preferences (e.g., attributes with '1' values) set in the personalized subject vectors has corresponding negative attribute '0' values set for the product related vectors, then the product is not compatible for the consumer. Finally, if a product presents only a part of the corresponding product related vectors to all the personalized subject vectors in the user system 104, or any of the preferences (e.g., attributes with '1' values) set in the personalized subject vectors has corresponding unknown attributes 'null' values set for the product related vectors, then the product may or may not be compatible for the consumer.

In another embodiment, the compatibility indicator may be reported as a score (e.g., 9-100) where a score of 100 reflects a highest compatibility rating based on a number of attribute matches in a vector. Alternatively, the compatibility indicator may be reported as a 'yes,' 'no,' or 'warning' using the scoring system above whereby a score (e.g., 81-100) indicates compatibility, a score (e.g., between 40-80) indicates a warning and a score (e.g., 0-39) indicates a lack of compatibility.

Accordingly, at step 520, if the product is determined to be compatible, the vector preference logic 114 presents a notification on the user system 104 indicating the compatibility (e.g., "this product is pesticide free"). If however, the product is determined not to be compatible or it is uncertain if the product is compatible, the vector preference logic 114 presents a suitable notification on the user system 104 in the form of a warning, alert or suggestion. For example, if the product is not compatible with the consumer's preferences, the notification may indicate "this product contains eggs," in the case where the consumer has indicated an allergy to egg products. If the product's compatibility is undetermined with regard to the consumer's preferences, the notification may indicate "please see store associate for assistance." Alternatively, the notification may be a sound, icon, or animation indicating the compatibility indicator.

In an alternative embodiment, the advisor logic 110 may be configured to process the scanned product related vector information and personalized subject vectors by considering matching attributes for only a subset of the total attributes in a given vector (e.g., if two or more attributes match, the product is considered compatible for the consumer). Alternatively, the product may be rated with a match score from 0-100 as a result of the calculation performed by the logic 114. It will be understood that these and other variations of the logic may be contemplated in order to realize the advantages of the exemplary embodiments.

In one embodiment, the vectors may be updated over time and have several associated versions. Over time, any vector may have histories reflecting the addition of new attributes or the splitting of existing attributes (for detailing). In order to maintain consistency among the vectors for the product labels and the user systems, the host system 102 (or the mobile advisor service server 106) may configure the vectors to include a separate field that indicates a version number of level of the vector. The new vectors may then be distributed to appropriate entities for storage and use.

Technical effects of the invention include the ability to define product-related vectors for different subjects associated with products sold by the enterprises. The product-related vectors include attributes identifying characteristics of the subjects. Product labels are then created with this information encoded thereon. Consumers are then able to identify and receive particularized information about products or services at a point of purchase through a mobile device or kiosk. The mobile product advising incorporates the use of the product labels with encoded product information and a mobile application for configuring user preferences. The user preferences are defined using personalized subject vectors. When an end user device, such as a mobile phone scans a product label for its product information, the mobile application identifies matching attributes in terms of the end user's preferences from the user's personalized subject vectors with the product-related vectors, and provides this information to the end user device. These and other features of the mobile product advising will now be described.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method comprising:
    creating, via a computer processor, vectors for each of a plurality of subjects corresponding to a product and assigning attributes of the subjects to corresponding fields of the vectors;
    assigning values in the fields of the vectors reflecting a status of the attributes relative to the subjects;
    creating a product label for the product;
    encoding the vectors including the attributes and values on the product label
    comparing scanned data from the product label with a preference vector created for an end user;
    determining a compatibility indicator responsive to the comparing; and
    presenting a notification indicative of the compatibility indicator to an end user device of the end user.

2. The method of claim 1, further comprising:
    activating a subset of the vectors on the product label, via the computer processor over a network, based on a satisfied condition; and
    de-activating at least a portion of the subset of vectors on the product label, over the network, when the condition is no longer satisfied.

3. The method of claim 1, wherein the product is a food item and the subjects comprise food allergies.

4. The method of claim 1, wherein the product is a food item and the subjects comprise diet data.

5. The method of claim 1, wherein the product label is created as one of a:
    two-dimensional bar code;
    near field communications code;
    universal product code; and
    radio frequency identifier code.

6. The method of claim 1, further comprising providing a user interface to the end user device, the user interface configured to receive user preferences with respect to the subjects and create the preference vector from inputs received from the end user.

7. A system comprising:
    a host system computer; and
    logic executable by the host system computer, the logic configured to implement a method, the method comprising:
    creating vectors for each of a plurality of subjects corresponding to a product and assigning attributes of the subjects to corresponding fields of the vectors;
    assigning values in the fields of the vectors reflecting a status of the attributes relative to the subjects;
    creating a product label for the product;
    encoding the vectors including the attributes and values on the product label;
    comparing scanned data from the product label with a preference vector created for an end user;
    determining a compatibility indicator responsive to the comparing; and
    presenting a notification indicative of the compatibility indicator to an end user device of the end user.

8. The system of claim 7, wherein the logic further implements:

activating a subset of the vectors on the product label, via the computer processor over a network, based on a satisfied condition; and de-activating at least a portion of the subset of vectors on the product label, over the network, when the condition is no longer satisfied.

9. The system of claim 7, wherein the product is a food item and the subjects comprise one of:
   food allergies; and
   diet data.

10. The system of claim 7, wherein the product label is created as one of a:
    two-dimensional bar code;
    near field communications code;
    universal product code; and
    radio frequency identifier code.

11. The system of claim 7, wherein the logic is further configured to implement:
    providing a user interface to the end user device, the user interface configured to receive user preferences with respect to the subjects and create the preference vector from inputs received from the end user.

12. A computer program product comprising a computer-readable storage medium having instructions embodied thereon, which when executed by a computer, cause the computer to implement a method, the method comprising:
    creating vectors for each of a plurality of subjects corresponding to a product and assigning attributes of the subjects to corresponding fields of the vectors;
    assigning values in the fields of the vectors reflecting a status of the attributes relative to the subjects;
    creating a product label for the product;
    encoding the vectors including the attributes and values on the product label;
    comparing scanned data from the product label with a preference vector created for an end user;
    determining a compatibility indicator responsive to the comparing; and
    presenting a notification indicative of the compatibility indicator to an end user device of the end user.

13. The computer program product of claim 12, further comprising instructions for:
    activating a subset of the vectors on the product label, via the computer processor over a network, based on a satisfied condition; and
    de-activating at least a portion of the subset of vectors on the product label, over the network, when the condition is no longer satisfied.

14. The computer program product of claim 12, wherein the product is a food item and the subjects comprise one of:
    food allergies; and
    diet data.

15. The computer program product of claim 12, wherein the product label is created as a two-dimensional bar code.

16. The computer program product of claim 12, wherein the product label is created as a radio frequency identifier code.

17. The computer program product of claim 12, further comprising instructions for providing a user interface to the end user device, the user interface configured to receive user preferences with respect to the subjects and create the preference vector from inputs received from the end user.

* * * * *